United States Patent
Mital et al.

(10) Patent No.: US 8,823,711 B2
(45) Date of Patent: Sep. 2, 2014

(54) INCREMENTAL CREATION OF A GRAPHICAL OBJECT TO VISUALLY REPRESENT A DATA SET

(75) Inventors: Vijay Mital, Kirkland, WA (US); Darryl Ellis Rubin, Duvall, WA (US); Suraj T. Poozhiyil, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 361 days.

(21) Appl. No.: 12/972,269

(22) Filed: Dec. 17, 2010

(65) Prior Publication Data
US 2012/0154403 A1    Jun. 21, 2012

(51) Int. Cl.
*G06T 11/20*    (2006.01)

(52) U.S. Cl.
CPC ................. *G06T 11/206* (2013.01)
USPC ........................... 345/440; 345/629

(58) Field of Classification Search
USPC ............................................. 345/629
See application file for complete search history.

(56) References Cited

U.S. PATENT DOCUMENTS

| | | | |
|---|---|---|---|
| 5,257,349 A | 10/1993 | Alexander | |
| 6,836,270 B2* | 12/2004 | Du | 345/419 |
| 6,995,768 B2* | 2/2006 | Jou et al. | 345/440 |
| 7,212,208 B2* | 5/2007 | Khozai | 345/440 |
| 7,251,584 B1 | 7/2007 | Perazolo | |
| 7,555,471 B2 | 6/2009 | Hogue | |
| 8,294,715 B2* | 10/2012 | Patel et al. | 345/440 |
| 8,301,585 B2* | 10/2012 | Mourey et al. | 707/603 |
| 2008/0288889 A1 | 11/2008 | Hunt | |
| 2009/0070737 A1 | 3/2009 | Huang | |
| 2009/0160859 A1* | 6/2009 | Horowitz et al. | 345/440 |
| 2009/0322743 A1 | 12/2009 | Robin | |
| 2010/0049686 A1* | 2/2010 | Gotz et al. | 706/47 |
| 2011/0078160 A1* | 3/2011 | Gotz et al. | 707/750 |

OTHER PUBLICATIONS

Hanrahan, P. et al. "Visual Analysis for Everyone—Understanding Data Exploration and Visualization" Published 2007; http://www.tableausoftware.com/docs/Tableau__Whitepaper.pdf.

Doleisch, H. et al. "Interactive Feature Specification for Focus+Context Visualization of Complex Simulation Data" Joint Eurographics—IEEE TCVG Symposium on Visualization—Published 2003; http://www.vrvis.at/publications/pdfs/PB-VRVis-2003-023.pdf.

* cited by examiner

*Primary Examiner* — Hau Nguyen
*Assistant Examiner* — Ryan M Gray
(74) *Attorney, Agent, or Firm* — Steve Wight; Carole Boelitz; Micky Minhas

(57) ABSTRACT

A computerized tool to visually display data using a graphical object. Visual display components may be identified that can represent a portion of the data and may be proposed to a user, based on visual characteristics of each of the visual display components and parameter(s) of the data. A visual display component selected from these components based on user input may be linked to the portion of the data set so that the visual display component will modify the appearance of the graphical object in a way that represents the portion of the data. Different visual display components may be identified and suggested for a user's selection to represent other portions of the data using the graphical object. The graphical object may thus be incrementally refined to ultimately result in the visual representation of the data.

20 Claims, 13 Drawing Sheets

INCREMENTAL CREATION OF A GRAPHICAL OBJECT TO VISUALLY REPRESENT A DATA SET

BACKGROUND

Today, people are regularly exposed to large amounts of information, particularly in the form of quantitative data. To analyze and assess such data, it is often useful to present the data in an intuitive manner. It may also be useful to manipulate the quantitative data in a number of way for exploration and presentation purposes. Computing environments provide the ability for users to analyze the large amounts of data. For example, the data may be displayed and manipulated through a visually interactive user display.

Users often operate computers having processors run with suitable software to gather, organize, manipulate and present data. Spreadsheets, for example, are commonly used to view and analyze large amounts of data. Portions of a data set contained within a spreadsheet may be selected in a manner to create a graphical representation of the data, such as in the form of a chart or graph. For example, data may be input from a spreadsheet into a line graph in a straightforward manner, so that trends along the function set forth by the line graph and determined by the data set can be easily visualized. Data plotted out by the line graph may also be manipulated, in turn, by altering features of the line graph and/or dimensions of the data set itself.

SUMMARY

The subject matter relates generally to visually representing a data set. The data set may be presented visually to a user by using values of data in the data set to control visual characteristics of a graphical object. To aid a user in selecting a suitable graphical object, a tool may allow a user to incrementally specify visual display components associated with the graphical objects to represent different portions of the data set. When a visual display component is selected and linked to a portion of the data set, that visual display component will modify the appearance of the graphical object in a way that represents some portion of the data.

As the user indicates dimensions of the data set, or other suitable portions of the data set to be represented, the tool may identify and suggest to the user visual display components suitable for representing the indicated portion of the data set. The suggested visual display components may be components that already exist in the graphical object and that are modified in appearance when linked to the data or may be components that augment a graphical object.

Visual display components existing as part of the graphical object that are suitable for representing a portion of the data set may be identified based on visual characteristics of the graphical object. For example, a shape, color, size, boundary and other visual characteristics of the graphical object may be assessed to select visual display components. In some embodiments, when it is determined that existing visual display components cannot be identified using the graphical object, visual display components to augment the graphical object may be suggested to represent a portion of the data set.

The selection of the visual display components to suggest may be based on a correlation between characteristics of the portion of the data set to be represented using the graphical object and visual characteristics of the visual display components. For example, a type of data in the data set may be compared to the type of parameters that vary the appearance of a visual display component.

A graphical object may be used as a basis for the visual representation of the data set. Different visual display components may be identified as each portion of the data set is indicated by a user. The identified visual display components may then be suggested to a user via the user interface. In response to receiving an indication of a selection of a visual display component from the identified visual display components, the graphical object may be modified by representing the portion of the data set through the selected visual display component.

The graphical object may be modified incrementally as portions of the data set are visually displayed using the graphical object through visual display components selected to represent the portions. Accordingly, different sets of visual display components may be identified for representing different portions of the data set during an iterative process of designing the graphical object.

In embodiments in which the graphical object is constructed starting from an initial graphical object, a suitable initial object may be obtained in a number of ways. In some embodiments, a graphical object may be received in a form of a sketch. User input may be received rendering such a sketch of an arbitrary graphical object. The user may then be guided to incrementally add portions of a data set, thus modifying the sketch to ultimately create the desired representation of the data set using the graphical object.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
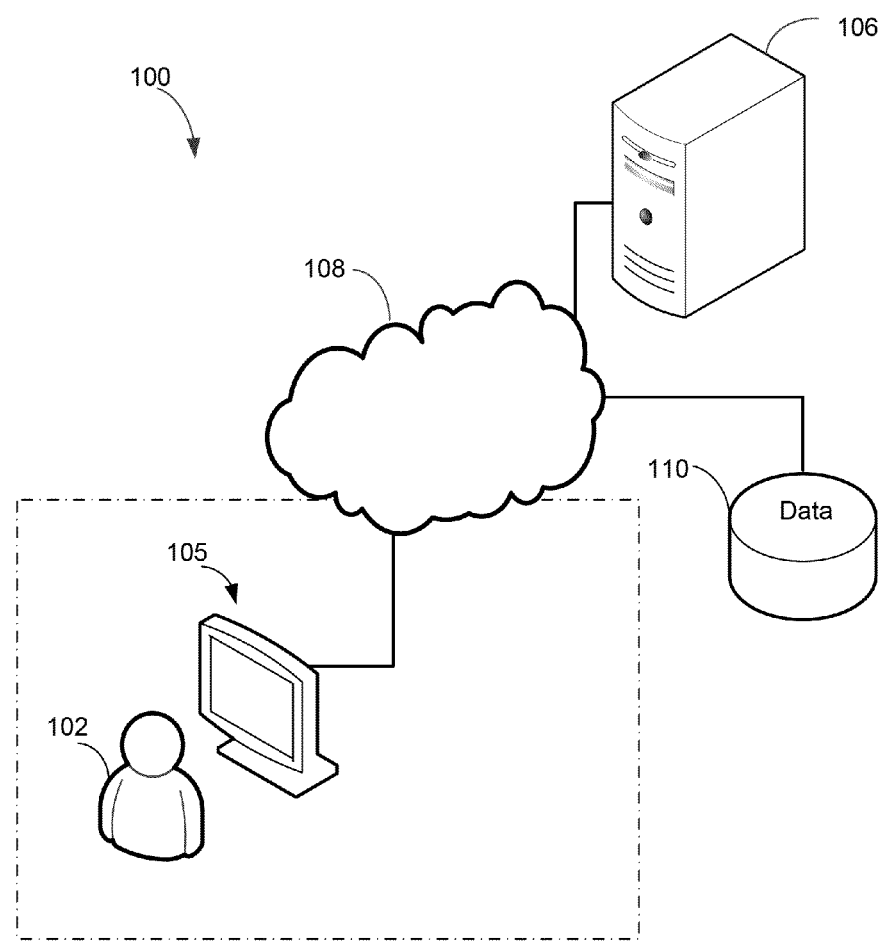
FIG. 1 is a high-level block diagram illustrating a computing environment in which some embodiments may be practiced.

The inventors have recognized and appreciated advantages of generating a visual representation of a data set using a graphical object via incremental modification of the graphical object. The graphical object may be modified when visual display components selected as suitable for representing different portions of the data set are linked to these portions so that to modify the graphical object. Different visual display components may be selected and proposed to a user at different steps of the incremental modification.

In some cases, a user may select a graphical object from a number of graphical objects that may be available to visually represent data and a computing device may propose one or more of the graphical objects to a user. However, many users are relatively unsophisticated in graphics design and it may not be straightforward for such users to select a graphical object appropriate to represent a data set of interest. It may be particularly not intuitive for the user to decide on a suitable graphical object when the data to be visually displayed is multidimensional data.

Accordingly, a computerized tool is provided that allows a user to visually display a data set by incrementally building the representation of the data set using a graphical object. The tool may identify one or more visual display components to represent a portion of the data set. The identified visual display components may be proposed to a user for the user's selection. In response to user's specifying a visual display component from the identified visual display components, the graphical object may be modified by representing the portion of the data set through this selected visual display component.

Portions of the data set to be visually displayed at steps of the incremental modification of the graphical object may be indicated by a user or received in any other suitable manner. Different visual display components may be identified as each portion of the data set to be represented is indicated. When a suitable input is received indicative of a selection of a visual display component from these visual display components identified as candidates for representing the indicated portion of the data set, the graphical object may be again modified, with a further selected visual display component. Such incremental modification of the graphical object by stepwise addition to the graphical object ultimately results in the visual representation of the data set using visual display components representing different portions of the data set.

The graphical object may be modified in any suitable way. A portion of the data set may be linked to a visual display component selected to represent that portion. Linking data to an existing visual display component in the graphical object modifies the visual appearance of the graphical object in a way that represents the portion of the data set. Alternatively, the appearance of the graphical object may be modified by augmenting the graphical object with the selected visual display component which has an appearance controlled by values of the data portion to which it is linked. Also, modifying the graphical object may comprise substituting at least one visual element within the graphical object with the selected visual display component. The visual element may be any suitable element characterizing the visual appearance of the graphical object, such as a visual display component. Any visual element within the graphical object may be replaced with a suitable object. For example, a point on a graph may be replaced with a drawing (e.g., a two-dimensional or a three-dimensional drawing). As another example, a texture of a structure (e.g., a building) may be replaced with a photograph. Though, embodiments of the invention are not limited in this respect. As a result, one or more of the visual characteristics of the graphical object may change when the portion of the data is represented through the visual display component.

The visual display components suitable for representing a portion of a data set may be identified based on their visual characteristics and parameter(s) of the portion of the data set. The visual characteristics of a visual display component may comprise color, shape, texture, plurality of segments of the visual display component, a plurality of visual elements, at least one segment of a visual element from the plurality of visual elements, at least one stack of visual elements, at least one cluster of visual elements, at least one grouping of visual elements, or a plurality of boundaries that map to the at least one portion of the data set, or any other suitable characteristics. The visual elements may be any suitable elements characterizing the visual appearance of a visual display component. The parameters of data in the data set portion may comprise a type of the data or other suitable parameters. In some embodiments, the portion of the data set may be a dimension of the data set.

The visual display components may be identified for the user's selection based on a correlation between parameters of the portion of the data set to be represented using the graphical object and visual characteristics of the visual display components. For example, a type of data in the data set may be compared to a type of parameters that vary the appearance of a visual display component. Identifying the visual display components for representing a portion of the data set may thus comprise identifying visual characteristic(s) of the visual display components that are configured to be controlled by a parameter that varies in a same way as values in the dimension of the data set.

In some embodiments, a tool may initially attempt to identify visual display components based on the graphical object itself. For example, a computerized tool may identify visual display component(s) that already exist in the graphical object and that are modified in appearance when linked to the data. In some cases, the visual display components may be components that augment a graphical object. In some cases, if no visual display components can be identified based on the graphical object, the graphical object may be suitably modified by adding visual display components that can be varied based on the data set. Such visual display components may be identified from another source (e.g., a store of visual display components) and proposed to the user.

The specific criteria used to determine whether a visual display component is suitable for representing a portion of a data set is not critical to the invention. In some embodiments, the suitability may be based on the visual display component having a parameter that exhibits the same range and type of variation as the data. In other embodiments, a visual display component for representing a portion of the data set alternatively or additionally may be identified based on an insight that is likely to be revealed when the visual display component is used to represent the portion of the data set. This includes matching the insight that the visual display component is capable of revealing with an insight that the user desires to gain from displaying of the portion of the data set. The desired insight may comprise, for example, recognizing one or more trends within the data set, a recognition of differences, similarities, contrasts between portions of the data set or any other suitable information that allows the user to get an understanding of an aspect of the whole data set or its portion.

A computerized tool may determine a desired insight based on the graphical object. For example, one or more visual characteristic of the graphical object that is currently being displayed may be used to identify the desired insight. The desired insight may also be received as an explicit indication (e.g., based on user input) or may be identified using a computer-based inference based on user's prior interaction with the data set, characteristics of the data set or in other ways.

In some embodiments, the type of insight that users may desire to gain from analysis of a data set may be represented in an insight taxonomy. The computerized tool suggesting visual display components for representing a portion of the data set to provide a desired insight may identify the desired insight by making a selection from the taxonomy.

Visual display components also may be classified in accordance with the insight taxonomy. Accordingly, selecting a visual display component to suggest may entail selecting those components classified in the taxonomy in the same way as the desired user's insight.

Interactivity may also be used as a criteria to select a visual display component. In some embodiments, a visual display component employed to represented a portion of a data set may be interactive. Accordingly, the visual display component may receive user input indicating a change in the portion of the data set or a change in a way in which the portion is represented. As a result, one or more of the visual characteristics of the visual display component may be affected so that the appearance of the graphical object is modified.

The graphical object may be used as a basis for the visual representation of the data set. Accordingly, an initial graphical object may be received which is then modified by incremental additions of different portions of the data set to visually display the data set.

A suitable initial object may be obtained in a number of ways. In some embodiments, a graphical object may be received in the form of a sketch. User input may be received rendering such a sketch of an arbitrary graphical object. For example, if the user analyzes a data set comprising box office sales on different genres of movies, the user may start by drawing a sketch of a maple leaf on a user interface. The user may then be guided to incrementally add portions of the data set by linking them to suitable visual display components, thus modifying the sketch. A final representation of the data set using the graphical object may therefore be created. In some scenarios, the initial graphical object may be selected from a set of pre-existing visual objects, which may be any suitable graphical objects, including arbitrary graphical objects.

When one or more visual display components suitable for representing a portion of a data set are identified, a user may be presented with a suggestion on a user interface for activating and incorporating one or more visual display components identified using any of the techniques described above. The suggestion may be presented in any suitable way and format. For example, visual controls, such as interactive icons, menus and other objects may be presented which are capable of receiving input indicative of selection of the respective visual display component.

Visual display components used to represent a data set in accordance with embodiments described herein may be any suitable visual objects. Non-limiting examples of the visual display components include boxes, cubes, bar charts, spirals, pie segments, circles, spheres, lines, arbitrary closed outline shapes or any other objects of different shapes and geometries. In some scenarios, visual display components may be two- or three-dimensional. Visual display components or their parts may be replicated, segmented into portions, or otherwise modified to represent the data set. Also, the visual display components may be arranged in a number of ways along a line, a curve or other object. In some cases, visual display components of different shapes may be arranged behind each other. The user may be enabled to manipulate the so arranged components to change a way in which the components are displayed on a user interface.

In some embodiments, a store of visual display components may be accessed to identify visual display component(s) capable of representing a portion of the data set using a graphical object. Each visual display component in the store may include metadata. Such metadata may be provided in any suitable way. For example, it may be provided by a human creator of the visual display component. Alternatively, a processor may analyze the visual display component to recognize visual characteristics that can be used to represent data and, in some embodiments, to recognize one or more insights that are likely to be revealed when the visual display component represents data. Such an analysis may be performed using pattern matching techniques or other suitable heuristics.

Accordingly, the metadata may specify information on visual characteristics of the visual display component that may be used in automatically identifying visual display components suitable for representation of a portion of a data set. In some embodiments, the metadata of the visual display component may also specify one or more insights that are likely to be revealed when the visual display component is used to represent data. The metadata may specify any other suitable information. A computerized tool may analyze the metadata of the visual display component to determine whether to propose this visual display component for the user's selection for use in representing a portion of the data set.

The data set to be analyzed and visually represented may be received from a suitable store. The data set may be stored in association with metadata that specifies information on parameters of the data set and/or portions of the data set. For example, this metadata may specify one or more types of data in the data set, dimensions of the data set, a way in which values in the data set are distributed, etc. The metadata may be analyzed, for example, to match the dimensions with visual characteristics of visual display components in the store of visual display components.

FIG. 1 is a high level diagram illustrating a computing environment 100 in which some embodiments of the invention may be practiced. Computing environment 100 includes a user 102 interacting with a computing device 105. Computing device 105 may be any suitable computing device, such as a desktop computer, a laptop computer, a mobile phone, or a PDA. Computing device 105 may operate under any suitable computing architecture, and include any suitable operating system, such as variants of the WINDOWS® Operating System developed by MICROSOFT® Corporation.

Computing device 105 may have the capability to communicate over any suitable wired or wireless communications medium to a server 106. The communication between computing device 105 and server 106 may be over computer network(s) 108, which may be any suitable number or type of telecommunications networks, such as the Internet, a corporate intranet, or cellular networks. Server 106 may be implemented using any suitable computing architecture, and may be configured with any suitable operating system, such as variants of the WINDOWS® Operating System developed by MICROSOFT® Corporation. Moreover, while server 106 is illustrated in FIG. 1 as being a single computer, it may be any suitable number of computers configured to operate as a coherent system. Computing device 105 may also have access to any suitable source of data 110.

In the embodiment of FIG. 1, a data analysis system may execute on server 106, and computer 105 may provide a user interface through which a user may enter inputs and receive results. However, there is no requirement that the data analysis system execute on a server and it may, for example, execute wholly on computer 105.

Regardless of the type of input provided by user 102 that triggers generation of an input, computing device 105 may send the input to server 106 to obtain information relevant to the input. That information may be obtained from one or more data sets stored in database 110, which is also accessible over network 100. As part of retrieving or generating data relevant to the input, server 106 may select visual display components suitable for representing a portion of a data set that are returned to user 102. The information generated by server 106 may be sent over computer network(s) 108 and be displayed on a display of computing device 105. A display may be any suitable display, including an LCD or CRT display, and may be either internal or external to computing device 105.

Figure 2:
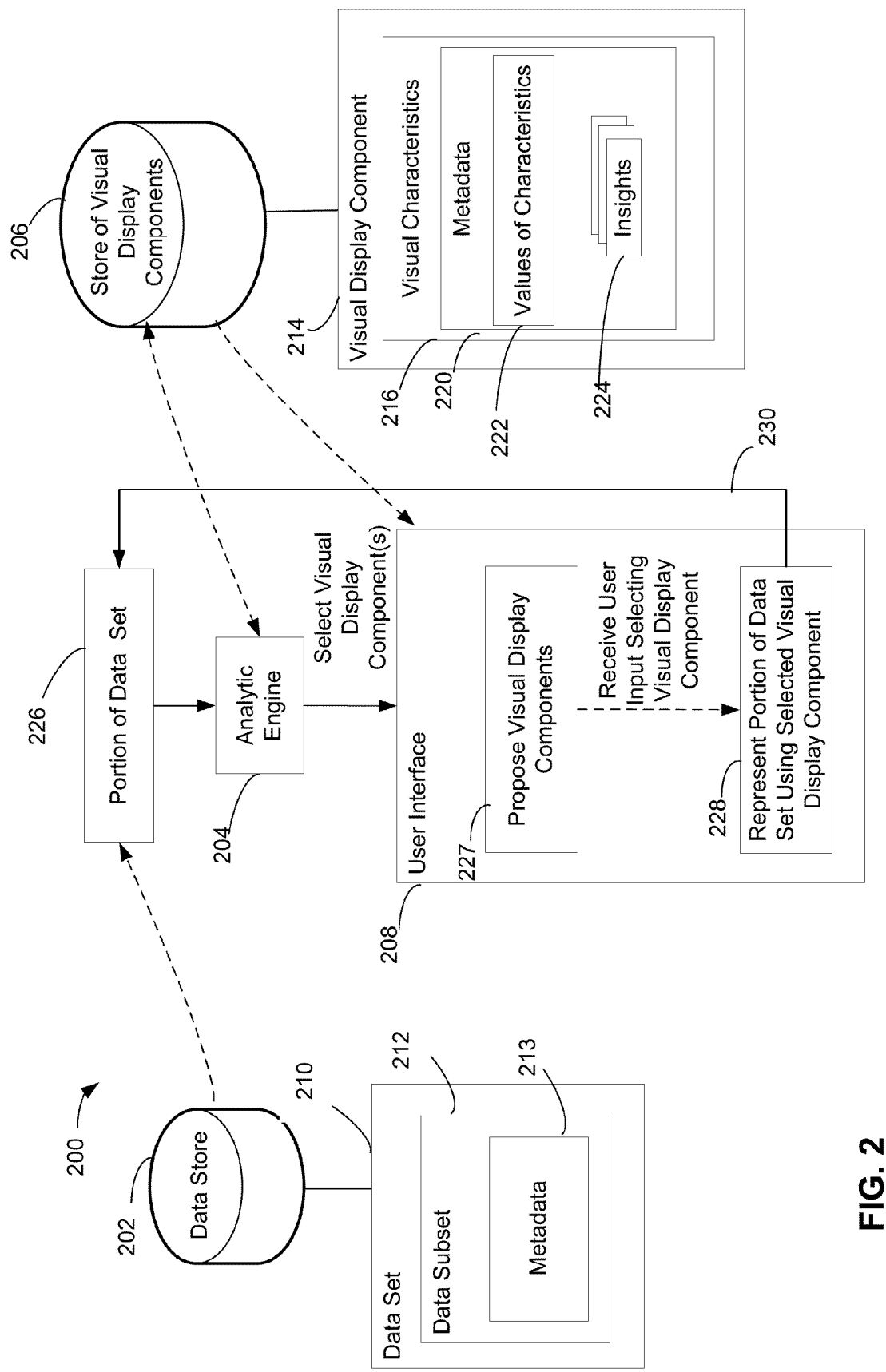
FIG. 2 is a schematic diagram of a system for selecting visual display components for representing a data set.

FIG. 2 is an illustrative diagram of a system 200 for representing a data set using a graphical object, which may be used as a basis for the visual representation of the data set. The system 200 includes a data store 202, an analytic engine 204, a store of visual display components 206 and a user interface 208.

The data store 202 includes any suitable set of data. Aspects of the data set 210 may be categorized by data subsets 212. Each data subset may be any suitable portion of the data set 210. For example, a data subset 212 may be a dimension of the data set 210. In some cases, one or more dimensions of the data set may be variable. Each of the data subsets 212 may have metadata 213 defining parameters associated with the data subset. For example, metadata 213 may include information on how data in the subset 212 may be organized or presented. Aspects of the data set 212 may be displayed and/or operated upon through a graphical object on the user interface 208.

The store of visual display components 206 may include multiple visual display components, such as a visual display component 214. The visual display component 214 may have visual characteristics 216 which may be associated with suitable metadata 220. Metadata 220 may identify parameters of the visual characteristics 216 and how they may be varied to change the appearance of the visual characteristics. Accordingly, metadata 220 may indicate types of data to which visual characteristics 216 may be linked.

In some embodiments, visual display components may be selected for representing a portion of a data set in accordance with an insight that a user desires to gain from analyzing the data set. In such embodiments, metadata 220 may identify one or more insights 224 that may be revealed from representing data using the visual display component 214. The visual display component 214 may therefore be selected to represent a portion of the data set when one or more of insights 224 match a desired insight.

The visual display components may be of any suitable formats. In some embodiments, the store of visual display components 206 may include visual display components of different geometries and shapes. Also, in some embodiments, the visual display components may comprise interactive components that may perform one or more operations on the data that may change the data or may be evaluative in nature, without changing the data. Any other suitable visual display components may be provided in the store 206. In some embodiments, visual display components are stored as a library of components accessible to a system for matching one or more visual display components to data desired by the user to be represented.

The system 200 includes a computerized tool such as the analytic engine 204 for analyzing visual display components in the store 206 in conjunction with a portion 226 of a data set to be represented using a graphical object. The portion 226 of the data set may be any suitable portion of the data set. For example, the portion 226 may comprise a dimension of the data set. When the portion 226 of the data set is identified, analytic engine 204 may select one or more visual display components suitable for being linked to the portion so as to modify the graphical object. The analytic engine 204 may be a single component executed by one or more processors or may encompass more than one component executed by the processors.

To identify visual display components that are capable of representing the portion 226 of the data set, the analytic engine 204 may apply a set of rules that allow determining which visual display components can represent a portion of the data set. The selection may be based on at least one visual characteristic of each selected visual display component, at least one parameter of the portion 226 of the data set or on other factors. The analytic engine 204 may step through the metadata 220 of the visual display component 214 and determine whether values 222 of visual characteristic(s) of the visual display component 214 are configured to be controlled by a parameter that varies in a same way as values in the portion 226 of the data set. The portion 226 of the data set may be a dimension of the data set, for example.

Other criteria may also be applied in identifying a visual display component. In some embodiments, visual display components may be identified, for example in accordance with a desired insight, based on whether one of more of insights 224 that can be revealed from representing data using the visual display component 214 match the desired insight.

The analytic engine 204 may identify a number of visual display components that can be used to represent the portion 226 of the data set, resulting in a display of the identified visual display component(s) on the user interface 208. The identified visual display components may be proposed 227 as suggestions (e.g., on a graphical menu or other control suitable of receiving user input) for a user to choose which visual display component to link to the portion of the data set. When a suitable user input is received indicating a selection of a visual display component, the component may be implemented. Accordingly, the user interface 208 may modify the graphical object by presenting (228 in FIG. 2) the portion 226 of the data set through the selected visual display component. As shown by an arrow 230 in FIG. 2, if available, another portion of the data set may be received and visual display components to represent this portion may be selected in the manner described above.

In embodiments described herein, visual display components may be any suitable visual objects of various shapes and geometries. Visual display components may be created through any tool suited for graphics generation and manipulation (e.g., MICROSOFT EXPRESSION® Studio, MAXON Cinema 4D). These visual display components may be existing components within a base graphical object that is being modified to represent portions of a data set. Alternatively or additionally the visual display components may be any other visual display component that may be used to augment a base graphical object. Accordingly, it should be appreciated that the store of visual display components may represent both visual display components that may be added to a base graphical object and visual display components that may already exist in an identified base graphical object.

Figure 3:
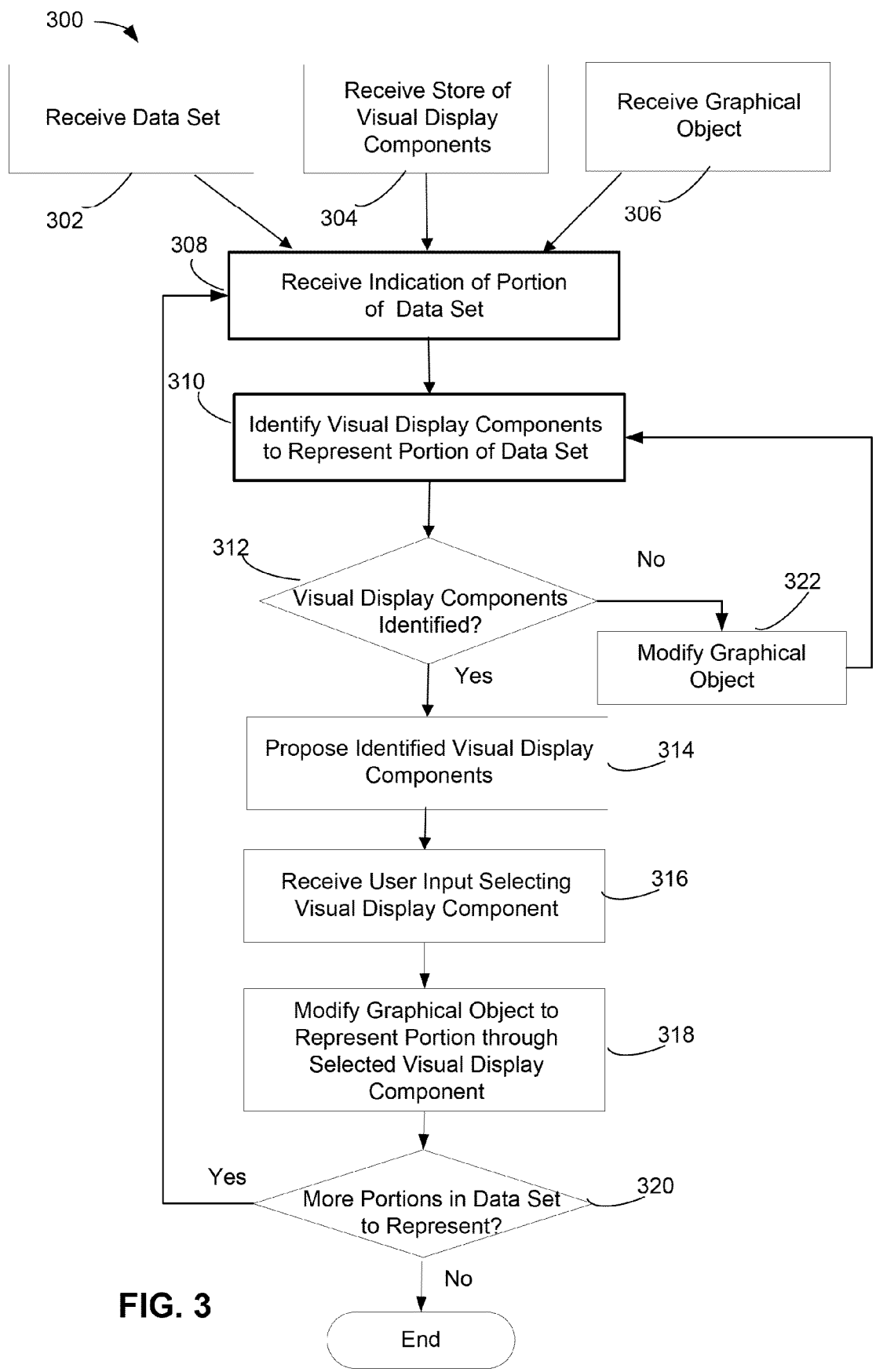
FIG. 3 is a flowchart illustrating a method of operating a computerized tool to identify and propose for user's selection visual display components for representing a data set using a graphical object, in accordance with some embodiments.

FIG. 3 is a flowchart illustrating a process of visually displaying a data set using a graphical object in accordance with some embodiments. Process 300 may be suitably executed by one or more processor of a computer-based system. The process 300 may begin in any suitable way. For example, a user initiated command communicated through a user interface of a computing system may be received. At block 302 the data set to be represented may be received, at block 304 a store of visual display components may be received, and at block 306 the base graphical object may be received. Processing at blocks 302, 304 and 306 may be performed in any suitable order.

The data set to be visually displayed may be received at block 302 in any suitable manner and may become accessible to the system either explicitly or implicitly. That is, a user may provide explicit input to a user interface for loading the data set into the system. Though, in some cases, the data set may be readily available by the system and automatically accessed without user intervention whenever an indication is made that a particular a data set is to be visually displayed. Similarly, the store of visual display components or other suitable collection of visual display components may become accessible to the system at block 304 either via explicit user input or via an inference performed by a graphical tool, such as by analyzing the base graphical object to identify suitable visual display components.

The graphical object received at block 306 may be an initial object that may be incrementally modified by representing different portions of the data set as linked to different visual display components. The base graphical object may be received in a number of ways. For example, the graphical object may be received in the form of a sketch. The user input may render the sketch of an arbitrary graphical object on a user interface. Multiple sketches of different graphical objects may be received from which a user may select the graphical object to be used to visually display the data set. Also, the graphical object may be received from a collection of existing graphical objects of any suitable complexity. Though, it should be appreciated that any suitable graphical object may be received in any suitable manner.

At block 308, a computerized tool may receive an indication of a selection of a portion of the data set being visually represented. The indication may comprise a selection of any suitable portion of the data set received at block 302. The portion may comprise a subset of the data set, a dimension of the data set or any other suitable portion of the data set. The portion of the data set may be selected in any suitable manner. For example, user input may be received indicating the portion. As a specific example, the portion of the data set may be selected by user input indicating a row, column or block of data cells in a data table. In some cases, the portion may be automatically loaded into the user interface used to represent the data set.

Next, at block 310, visual display components capable of representing the portion of the data set may be identified. The visual display components may be identified based on at least one visual characteristic of each of the identified visual display components, at least one parameter of the portion of the data set, or on other factors.

The identification of the visual display components may be based on a correlation between characteristics of the portion of the data set and visual characteristics of the visual display components. The visual characteristics of the visual display components may comprise color, shape, texture, a plurality of segments, a plurality of boundaries that may map to the portion of the data set and other suitable characteristics. The characteristics of the portion of the data set may comprise a type of data in the portion (e.g., discrete or continuous). The selection may comprise, for example, comparing a type of data in the data set to the type of parameters (e.g., values of characteristics 222 in FIG. 2) that vary the appearance of a visual display component.

At decision block 312, process 300 may branch based on whether the visual display components capable of representing the portion of the data set have been identified. If such visual display components have been identified, process 300 may continue to block 314, where the identified visual display components may be proposed to a user on the user interface. The visual display components may be presented for the user's selection in any suitable manner—for example, they can be displayed as a menu of respective controls capable of receiving user input indicating a selection of one or more of the controls. Thus, a suitable input may be received indicating a selection of any of these controls to select a corresponding visual display component for representing the portion of the data set using the graphical object.

Accordingly, at block 316, user input may be received specifying selection of one or more of the identified visual display components. In response to the selection, at block 318, the graphical object may be changed to represent the portion of the data set through the selected visual display component. Any suitable change of the graphical object may be implemented. For example, the appearance of an existing visual characteristic of the graphical object may be modified in a way that represents the portion of the data set. The graphical object may also be augmented with the selected visual display component such that the visual display component is displayed in association with the graphical object.

Process 300 provides a way to incrementally build the visual display of the data set by representing portions of the data set using the graphical object. Accordingly, it may be determined, at decision block 320, whether the data set includes other portions to be represented using the graphical object. If this is the case, process may return to block 308, where an indication of another portion of the data set may be received. Process 300 may then continue to identify visual display components to represent this other portion, as described above. Different visual display components may be identified for representing different portions of the data set.

Process 300 may continue operating until all or some of the portions of the data set are represented using the graphical object. Accordingly, when it is determined, at decision block 320, that no other portions of the data set are to be visually displayed, process 300 may end.

As discussed above, visual display components for representing a portion of the data set may be identified within the graphical object. Referring back to block 312, when it is determined that no visual display components capable of representing the portion of the data set have been identified, process 300 may branch to block 322, where the graphical object may be modified in a suitable manner. The modification may include suggesting visual display components to augment the graphical object so that represent the portion of the data set. The suggested visual display components may be proposed to a user and selected based on user input. In some scenarios, the graphical object may be modified dynamically. Though, the user may be enabled to either accept or reject the suggested modifications to the graphical object.

When processing at block 322 is completed, process 300 may continue at block 310.

Figure 4:
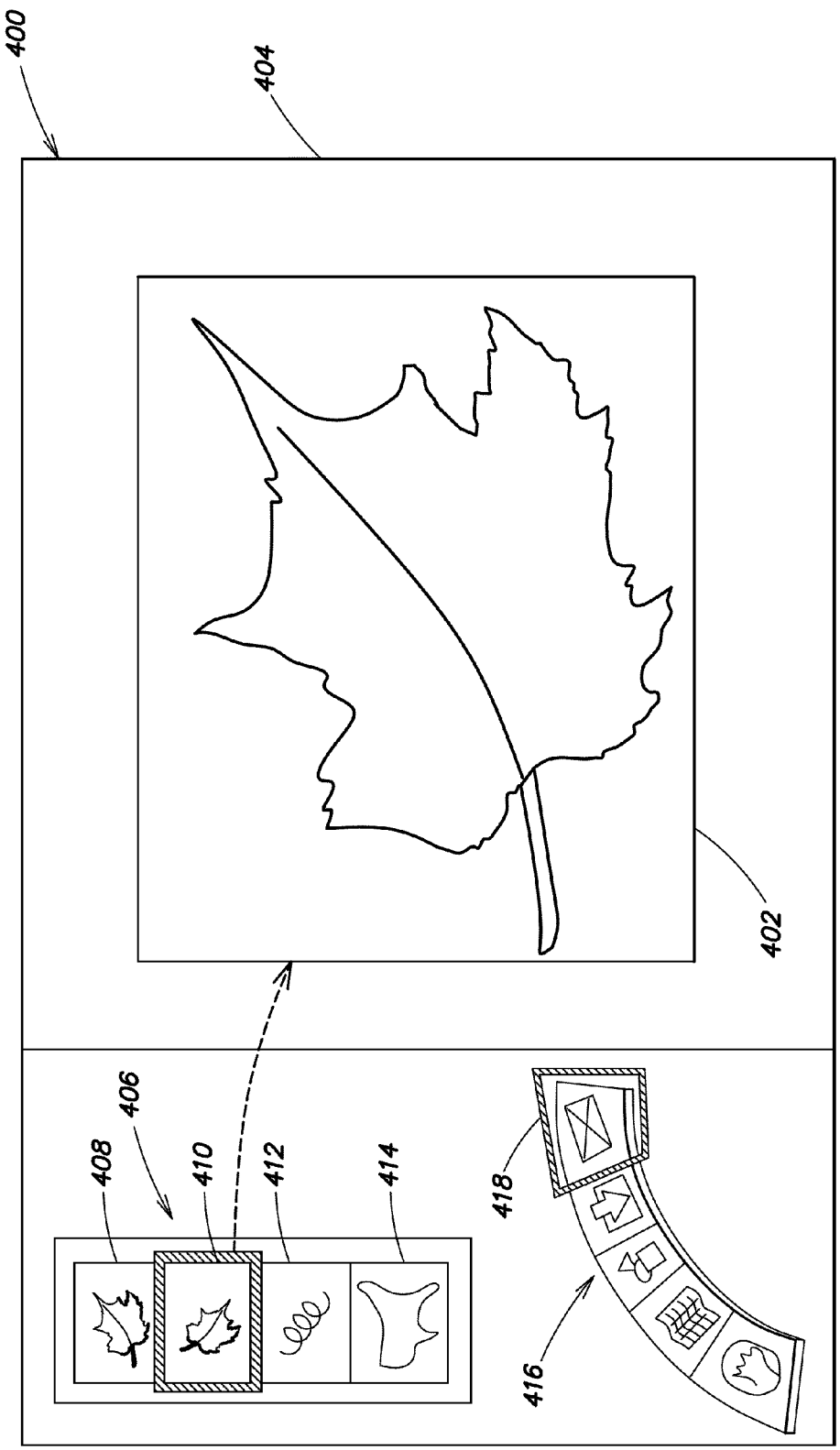
FIGS. 4-8 are illustrations of a representative user interface where a data set is visually displayed using a graphical object received in a form of a sketch by incremental augmentation of the graphical object with visual display components representing portions of the data set.

FIGS. 4-8 illustrate an example of incrementally building a visual representation of a data set using a graphical object. In this example, as illustrated in FIG. 4, an initial graphical object that is used as a basis for visually displaying the data set may be received by a user interface 400. For example, an initial graphical object comprising a sketch of a maple leaf 402 may be received in a main portion 404 of the user interface 400.

The initial graphical object 402 may be received based on a selection (e.g., based on user input) from a proposed collection 406 of graphical boxes 408, 410, 412 and 414, each representing a respective graphical object which may be used as an initial graphical object. In this example, the proposed initial graphical objects are sketches of different arbitrary graphical objects. Thus, graphical object 408 is a leaf, graphical object 410 is another leaf, graphical object 412 is a spiral and graphical object 414 is a map. Though, it should be appreciated that embodiments of the invention are not limited to any particular graphical objects used as initial objects and any suitable graphical objects may be substituted.

As shown in FIG. 4, the collection 406 of graphical boxes is presented based on a selection from a gallery 416 which suggests different options for representing the data set. In the example illustrated, an option 418 is selected (e.g., based on user input) indicating that the collection 416 is to be presented enabling the user to select an initial graphical object. The sketch of the maple leaf 402 is selected based on the selection of the graphical box 410 that is shown darkened in FIG. 4. Other options within the gallery 416 may be selected for modifications of the maple leaf 402 during the process of incremental representation of portions of the data set using the maple leaf 402.

The data set to be visually displayed using the maple leaf 402 may be received in any suitable manner. For example, the data set may be accessed via explicit user input. In this example, the data set may comprise, by way of example only, box office sales of movie tickets for different genres of movies during a few last years. This data may be represented so that a user may decide which movie to view (e.g., to buy, rent or see in a movie theater).

Figure 5:
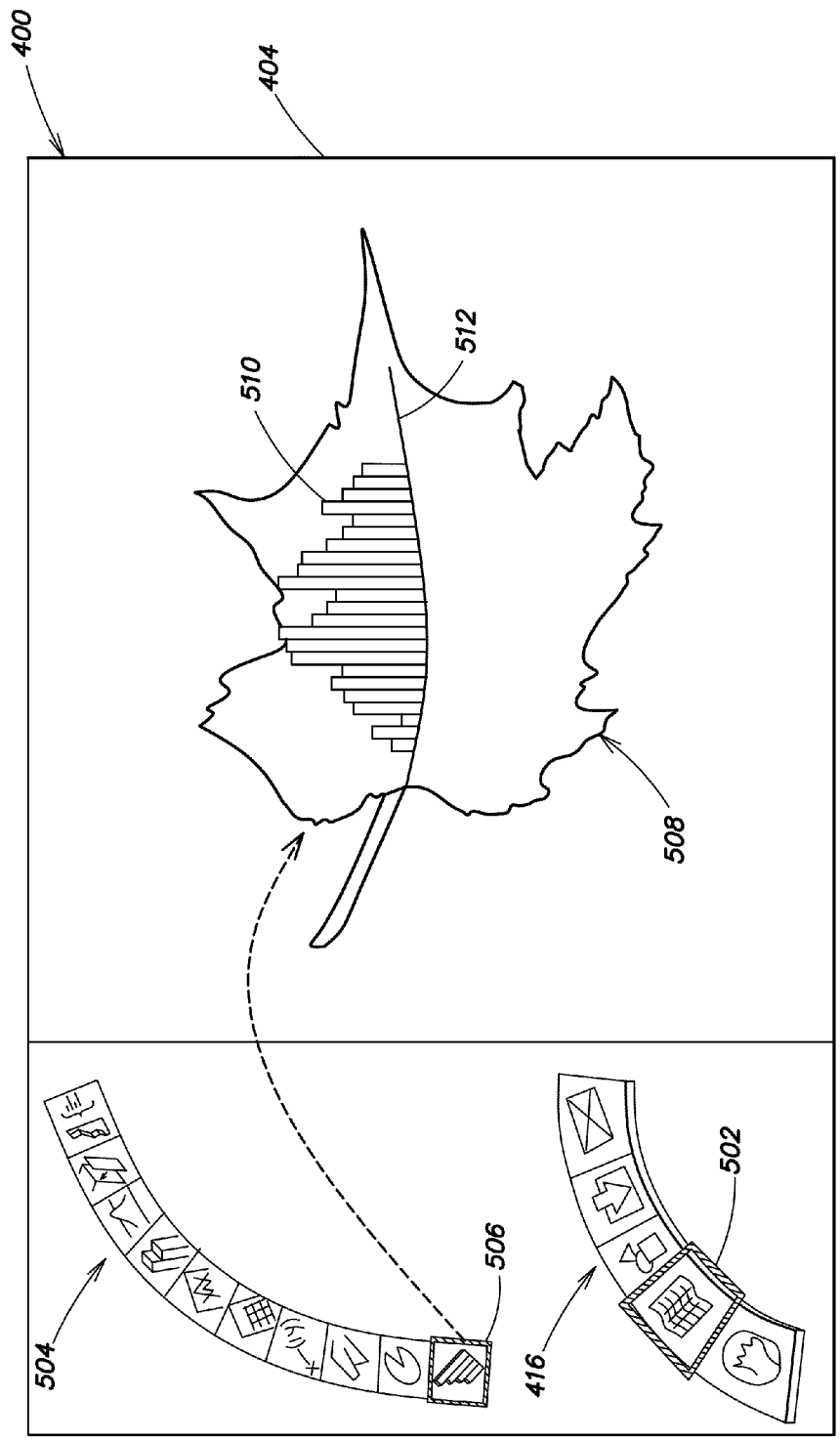

FIG. 5 illustrates a next step of building the visually representation of the data set using the graphical object. In this example, another option is selected from the gallery 416, which is indicated by a darkened graphical box 502. The graphical box 502 comprises an image of data and relates to a way to represent a portion of the data set using a visual display component. When this option is selected, a computerized tool may identify visual display components suitable for representing a portion of the data set. The portion of the data set which may be indicated in a suitable manner and may be, for example, total sales of the movie tickets during several years.

The computerized tool may identify the visual display components based on visual characteristics of each of the visual display components and at least one parameter of the data set or the portion of the data set to be visually displayed. Additionally or alternatively, the tool may identify the visual display components based on the graphical object. Thus, a shape, size, and other characteristics of portions of the maple leaf may be utilized to identify which visual display components are suitable for representing a portion of the data set using this graphical object. The tool may determine, for example, that a shape of the maple leaf is well suited to augment the leaf with a bar chart. Other visual display components (e.g., a pie chart, a line, a box or a collection of boxes, etc.) may also be identified as being suitable to represent the portion of the data set and proposed for the user's selection.

In some embodiments, the tool may identify an insight that the user desires to obtain from analyzing the data set. The visual display components may thus be identified based on their capability to represent the portion of the data set to reveal the insight. In embodiments where a type of the insight is identified in an insight taxonomy, visual display components may also be classified in accordance with the taxonomy. In such embodiments, visual display components to represent a portion of the data set may be identified based on whether their types as specified in the taxonomy match the type of the desired insight.

In the example illustrated, the computerized tool may identify that the user desires to obtain an insight comprising recognizing a trend in the box office sales data. A bar chart and other visual display components suitable to represent the portion of the data set to reveal the trend may be identified in accordance with the desired insight.

The identified visual display components may be proposed to the user in a form of a collection of graphical boxes 504 where each graphical box represents a corresponding visual display component that may be used to represent the indicated portion of the data set. The user may select a visual display component from the identified and suggested visual display components.

Accordingly, as shown in FIG. 5, user input may be received indicating selection from the collection 504 of a graphical box 506 corresponding to a bar chart. As a result of the selection, a portion of the data set may be linked to the bar chart and thus used to modify the appearance of the graphical object. Thus, the graphical object 402 as shown in FIG. 4 may be modified to result in the modified graphical object 508. In this example, the modified graphical object 508 is augmented with a bar chart 510 selected by the user from a number of visual display components. The graphical object may be augmented with the bar chart 510 in a suitable manner, including based on visual characteristics of the graphical object. In this example, the bar chart 510 is displayed along a stem 512 of the maple leaf. FIG. 5 illustrates that a graphical object used as a basis for visually displaying a data set may be modified by representing a portion of the data set through a visual display component identified and selected for this purpose.

Figure 6:
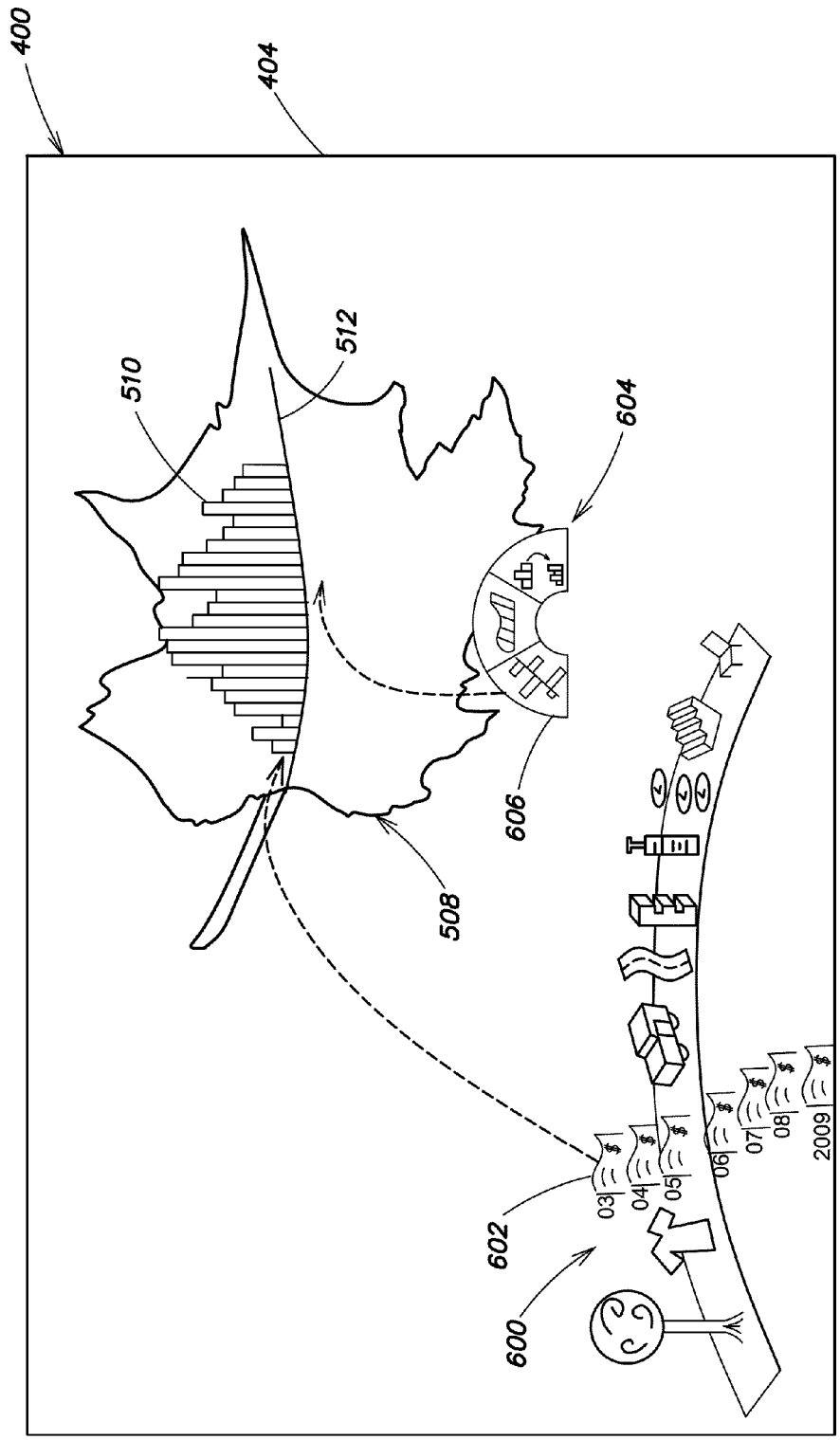

FIG. 6 illustrates that further visual display components may be identified for representing another portion of the data set. In this example, a collection 600 of visual display components may be identified and proposed to the user. These visual display components may be used to further modify the graphical object 508 by representing a portion of the data set comprising information on sales of movie tickets for particular genres of the movies. As shown in FIG. 6, sales from the year 2003 until the year 2009 may be selected to be represented using the graphical object.

In addition, FIG. 6 demonstrates that another set of visual display components 604 may be proposed to the user. In some embodiments, modification of a graphical object used to visually display a data set by representing portions of the data through at least one visual display component may comprise modifying the at least one visual display component. The visual display component may be modified by replicating the visual display component, dividing the visual display component into at least two sections, stacking segments of the visual display component, clustering segments of the visual display component, or modifying the visual display component in any other suitable manner.

Accordingly, the visual display components 604 may be selected to modify an appearance of the graphical object (the maple leaf in this example), with the bar chart. For example, when a visual display component 606 is selected, a bar chart may be presented with positive and negative portions, each displayed on a respective side of the stem 512 of the maple leaf. In this case, the appearance of the maple leaf is changed by augmenting it.

Figure 7:
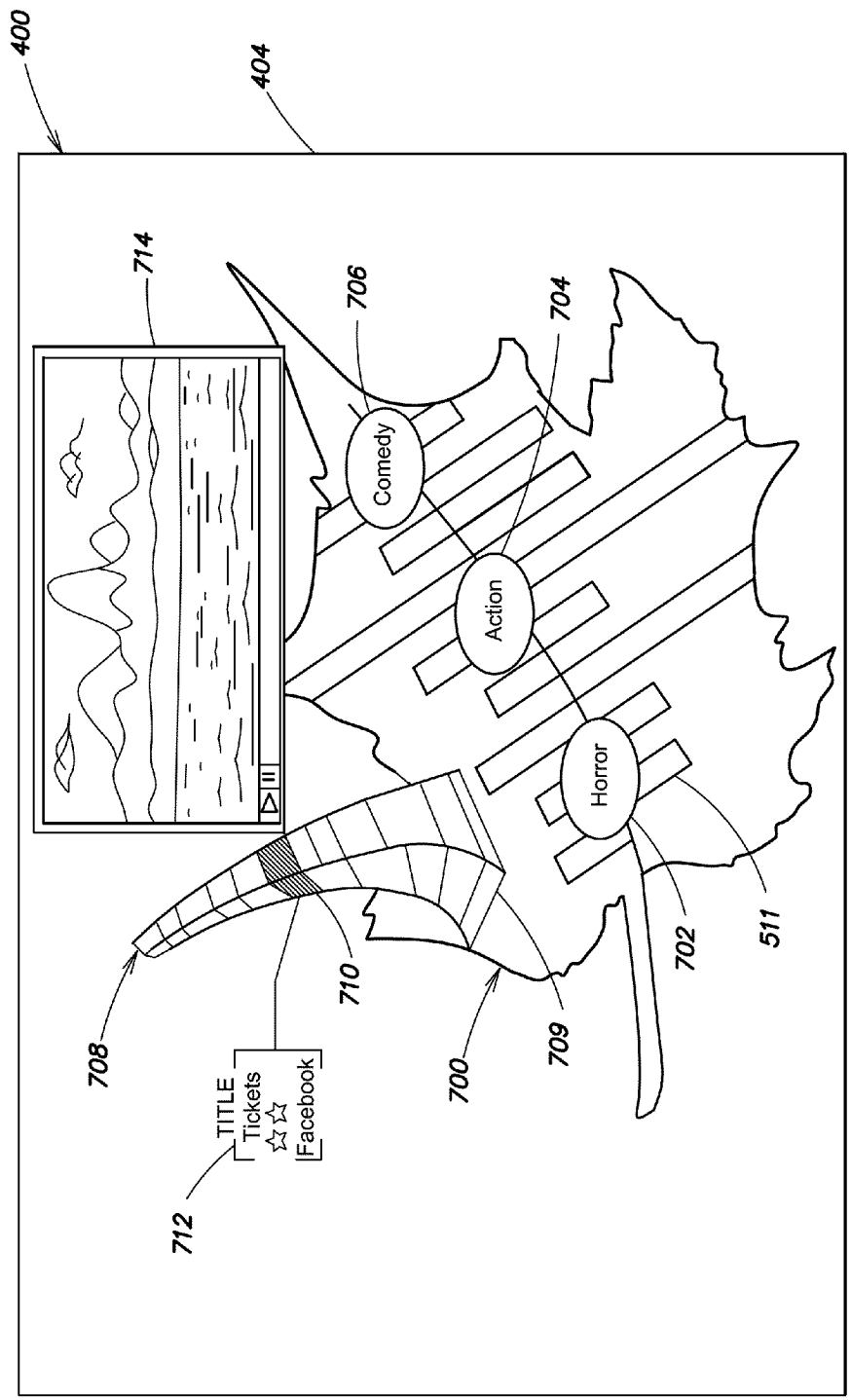

FIG. 7 illustrates the graphical object 700 modified as a result of the user's selection of visual display components 602 and 606 as show in FIG. 6. In the modified graphical object 700, the bar chart may be duplicated and, as such, represented along both sides of the stem of the maple leaf. Modifying the graphical object 700 may include substituting at least one visual element within the graphical object with a suitable visual display component, which may be explicitly selected by the user from a collection of suggested options of may be dynamically presented on the user interface. Accordingly, in FIG. 7, certain points within the graphical object 700 are replaced with visual display components (in this illustration, ovals) representing labels for different genres of the movies. FIG. 7 shows some of these labels as a label 702 for sales of horror movies, a label 704 for sales of action movies and a label 706 for sales of comedy movies.

When a visual display component is linked to a portion of the data set, the appearance of the visual display component may be modified based on values of data in the set. In FIG. 7, heights and/or widths of the bars of the bar chart representing respective sales of movies of different genres may be modified to reflect values of the sales. Any other visual effects (e.g., colors) may be employed in conjunction with the bars of the bar chart 511 to differentiate among sales of different genres of movies.

Visual display components may be displayed on the user interface in association with the graphical object in any suitable manner. For example, the bar chart 511 may be duplicated at both sides on the stem of the maple leaf. Other visual display components similarly may be replicated. Also, the components may be displayed in different arrangements, including in a suitable association with each other, such as stacked along a line or other object. In the user interface, some of the visual display components may be shown behind others.

FIG. 7 illustrates an example where, in addition to representing the total volume of sales of movies of different genres, the graphical object 700 may be augmented with a visual display component 708 representing more details on the sales data—e.g., sales data for particular movies within a genre. The sales data for movies of this genre is represented by one or more bars in the bar chart 511. Modifying the graphical object may comprise stacking suitable visual elements. As an illustrative example of the stacking, one of the bars (numbered 709) representing sales of action movies may be associated with the visual display component 708, which is a three-dimensional segmented bar, with the size of each of the segments representing a respective volume of sales of a particular action movie. For example, a darkened segment 710 within the visual display component 708 may represent data on sales of a certain movie. The visual display component 708 may be identified and presented for the user's selection in any of the ways described herein, which is not shown for the sake of simplicity.

In some embodiments, visual display components may be interactive. As such, either a visual display component or a suitable region with the graphical object may receive user input specifying a change in the way a data set is represented through the visual display. In response, the appearance of the visual display component and, consecutively, of the graphical object may be modified to reflect the change. The change may comprise presenting additional information which may comprise a portion of the data set. Any other change may be imparted (e.g., using a different color, modifying an angles at which the visual display component is displayed, etc.).

An example of an interactive visual display component is illustrated in FIG. 7. Here, the visual display component 708 may receive user input indicating a selection of a movie from the sales data on different movies within a genre. In response to the selection, additional information available on the movie may be displayed. For example, ratings of the movie by a community of users (e.g., by FACEBOOK users) may be displayed in association with the segment of the visual display component 708 corresponding to the movie.

As shown in FIG. 7, the visual display component 708 may receive user input indicating the particular movie 710 among the action movies. Accordingly, when the movie 710 is selected, a title and rating of the movie may be displayed, collectively numbered as 712 in FIG. 7. In this example, the movie is rated "**" (two stars) in accordance with users of the FACEBOOK social networking site. Any other data from the data set may be displayed using the graphical object. Accordingly, when the movie 710 is selected, a trailer 714 for this movie may be played to the user on the user interface 400, as shown in FIG. 7. This example illustrates that any suitable type of data may be represented through visual display components using the graphical object as embodiments described herein are not limited in this respect.

Figure 8:
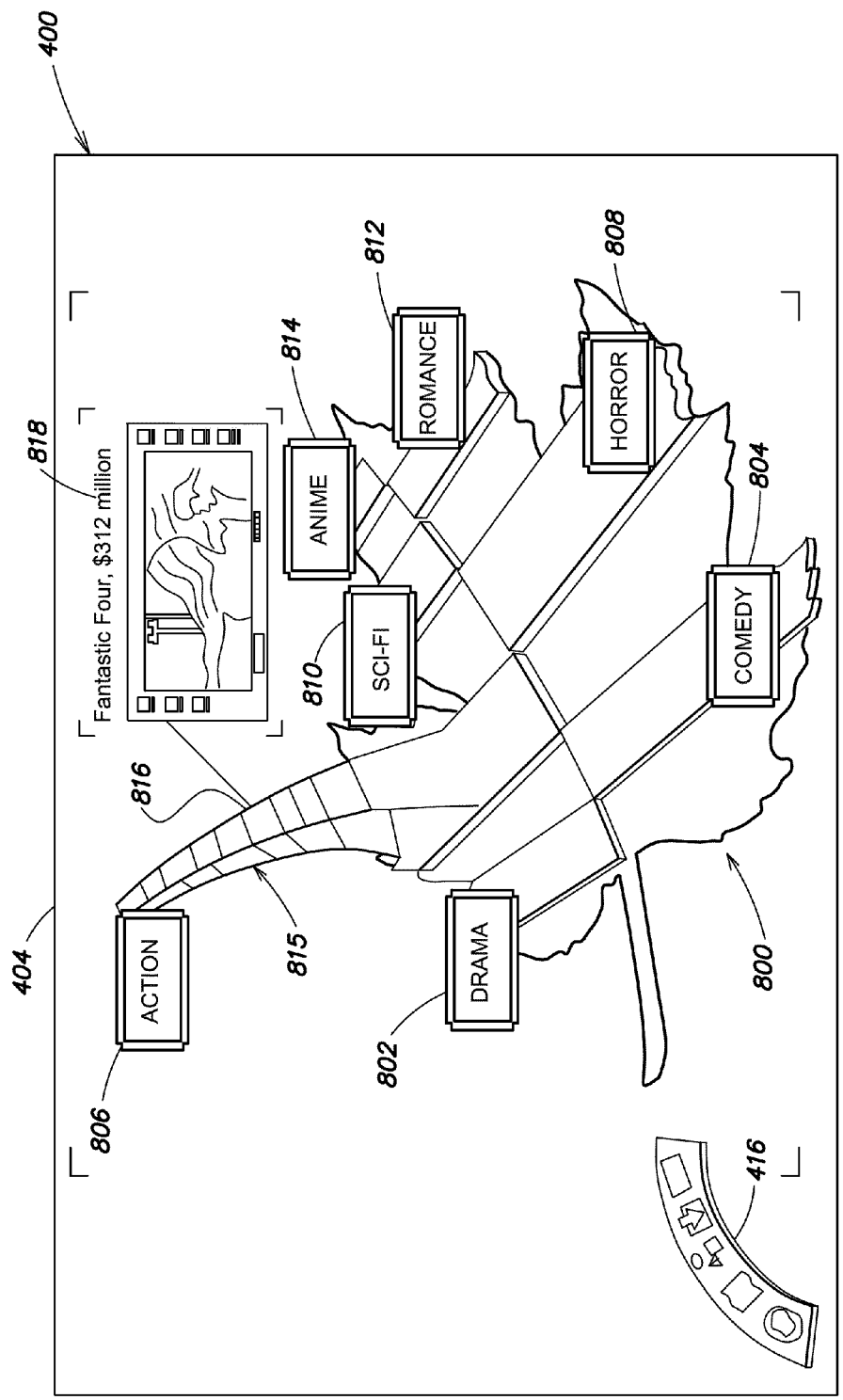

FIG. 8 shows another view of the visual representation of the data set created via the incremental modification of the graphical object shown in FIGS. 4-7. In this example, the maple leaf and visual display components used to represent the data set are depicted using different segments. Each segment shows a number of sales for a particular genre of movies. In some cases, the segments and/or a background may be of different colors (not shown). In FIG. 8, the modified graphical object 800 now shows the total volume of sales for drama 802, comedy 804, action 806, horror 808, sci-fi 810, romance 812 movies and anime 814 as respective bars of the bar chart. The graphical object 800 is similar to the graphical object 700 shown in FIG. 7 in that the bar representing sales of the action movies 806 is displayed in association with the three-dimensional segmented bar 815 representing another portion of the data set—i.e., data on sales by particular movies. As shown in FIG. 8, each segment of the bar 815 represents data on sales for a particular movie.

In the example in FIG. 8, bar 815 may be interactive. In particular, it may receive user input in response to which another portion of the data set may be displayed. For example, when a segment 816 of the bar 815 is indicated based on user input, a trailer 818 corresponding to this movie ("Fantastic Four") and sales data ("$312 million") may be displayed on the main portion 404 of the user interface 400.

FIGS. 9-13 illustrate another example of an incremental refinement of a graphical object to visually display a data set. In this example, an initial graphical object to be used as a basis for data representation may be selected from a set of predefined graphical objects. In this example, an initial graphical object is three-dimensional. At each step of the incremental modification of the selected graphical object, the graphical object may be augmented with an additional visual display component as a different portion of the data set is indicated to be represented.

Figure 9:
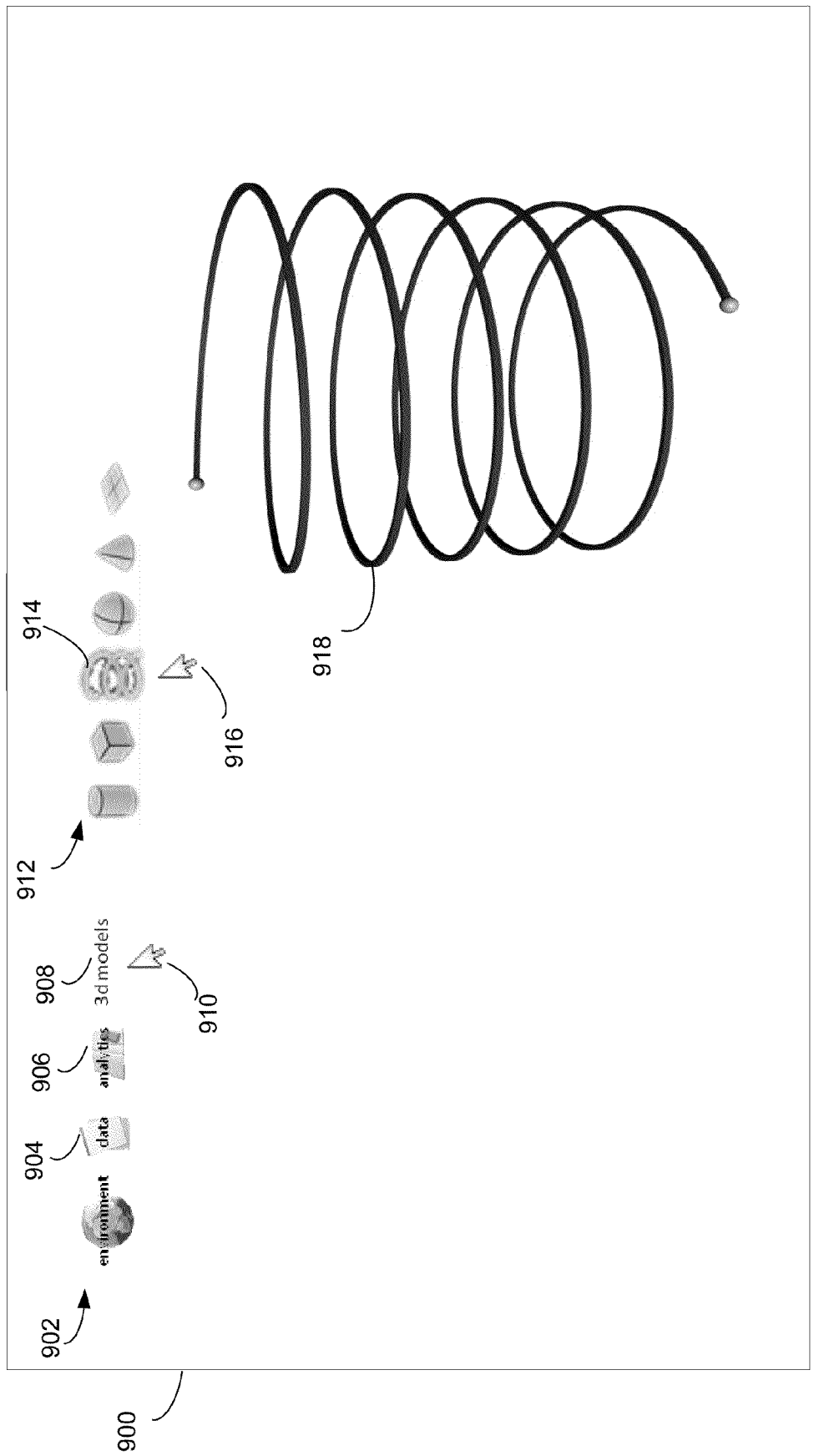
FIG. 9-13 are illustrations of a representative user interface where another data set is visually displayed using a graphical object by incremental augmentation of the graphical object with visual display components representing portions of the data set.

In FIG. 9, a canvas 900 may include a set of options 902 for a user to indicate what information is to be displayed on canvas 900 of a user interface. The options 902 may comprise "data" 904 used to indicate that a data set to be represented is to received, "analytics" 906 used to select analytic patterns (e.g., rules, equations, constraints, expressions as well as complex data structures, such as nested data), and "3d models" 908 used to select a three-dimensional graphical object from a number of choices to be used as a basis for the data representation. It should be appreciated that these options are shown by way of example only.

In this example, the user may select (e.g., via operation of a pointer 910) the "3d models" 908 option. When this option is selected, a collection 912 of three-dimensional objects may be displayed for the user's selection. The user may select a spiral 914 from the collection of objects 912, as shown by a pointer 916.

It should be appreciated that FIGS. 9-12 do not show an exact sequence of views of the user interface during the creation of the data representation for the sake of brevity. For example, even though canvas 900 depicts options 902 and collection 912 simultaneously, canvas 900 may display the options 902 first and, in response to the user's selection, the collection 912 may be displayed.

In response to the user's selection of the spiral 914, a respective graphical object 918 in a form of a three-dimensional spiral may be displayed on canvas 900.

A data set to be visually displayed may be received in a number of ways. For example, a user may provide explicit input to a user interface for loading the data set into the system. The user may then indicate a portion of the data set to be represented using a graphical object. Though, in some cases, the data set may be readily available to the system and may be automatically accessed without user intervention whenever an indication is made that a particular data set is to be employed.

Figure 10:
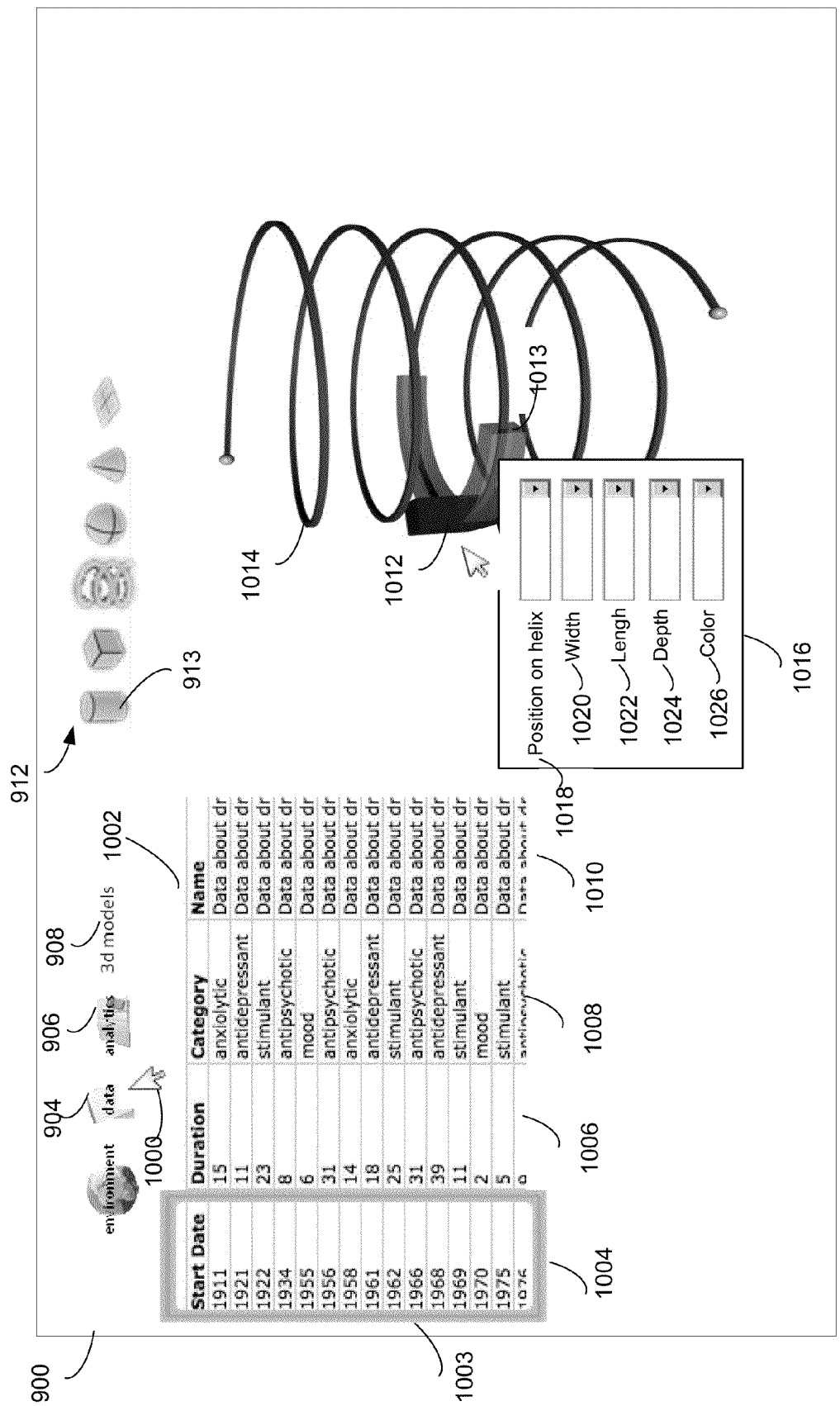

FIG. 10 shows, with a pointer 1000, that the option "data" 904 may be selected by the user to display a data set 1002 to be represented. While in this example the data set 1002 is at least partially shown on canvas 900, in some cases, the data set may not be depicted on the user interface. In this example, the data set comprises experimental data on drug intake by test subjects. The data set 1002 comprises columns "Start Date" 1004, "Duration" 1006, "Category" 1008 and "Name" 1010. Each of the columns 1004, 1006, 1008 and 1010 comprises a portion of the data set, which may be a dimension of the data set.

User input may be received indicating a portion of the data set to be represented using the graphical object. Thus, user input may indicate a portion of the data set 1002 comprising the column "Start Date" 1004, as shown by a frame 1003 around this column in FIG. 10. In response to the user input indicating the column "Start Date" 1004, start dates specifying dates when the drug began being tested may be represented on the graphical object. Suitable visual display components are identified to represent the start dates.

In embodiments described herein, a computerized tool may identify and propose for the user's selection visual display components suitable to represent a portion of a data set when the portion is indicated. As discussed above, visual display components may be identified based on the graphical object. Thus, visual characteristics of the graphical object (in this example, a helix) may be employed to select the visual display components. For example, the computerized tool may determine that the three-dimensional surface of the helix may be augmented with segments of different width, length and depth. The segments may be positioned at different locations within the helix and may be colored to represent certain aspects of the data set.

The visual display components may also be identified based on visual characteristics of each of visual display components and parameters of the data set. Accordingly, the computerized tool may determine that segments have visual characteristics that make them suitable to represent data in the data set. The segments may also be selected from three-dimensional objects from collection 912. For example, segment 913 may be selected from the collection 912.

In the example illustrated, the visual display components identified to represent the portion of the data set may be displayed on canvas 900 in association with the graphical object. FIG. 10 illustrates visual display components 1012 and 1013 each comprising a three-dimensional segment that may be linked to the portion of the data set and augment the graphical object to thus provide a modified graphical object 1014. The visual display components 1012 and 1013 may be stacked together. Also, they may form a single visual display component. Moreover, while only two visual display components 1012 and 1013 representing one or more values from the column "Start Date" 1004 are shown in FIG. 10, it should be appreciated that these components may be replicated and suitably modified to represent other values from this portion of the data set.

Data from column 1004 may be "dragged" from its position in the table of the data set 1002 onto the graphical object. As the graphical object is modified by representing other portions of the data set through visual display components, these portions may also be "dragged" onto the graphical object.

The visual display components 1012 and 1013 may be interactive and may thus receive user input specifying certain parameters that may be used for the visual representation of the visual display component 1012. The parameters may be specified using a control 1016 and may comprise menus "Position on helix" 1018, "Width" 1020, "Length" 1022, "Depth" 1024 and "Color" 1026. The control 1016 is also a visual display component. FIG. 10 schematically shows that components 1012 and 1013 may represent one or more values from the column "Start Date" 1004 using the parameters specified using the control 1016. Other values from the column "Start Date" may then be represented using the graphical object.

Figure 11:
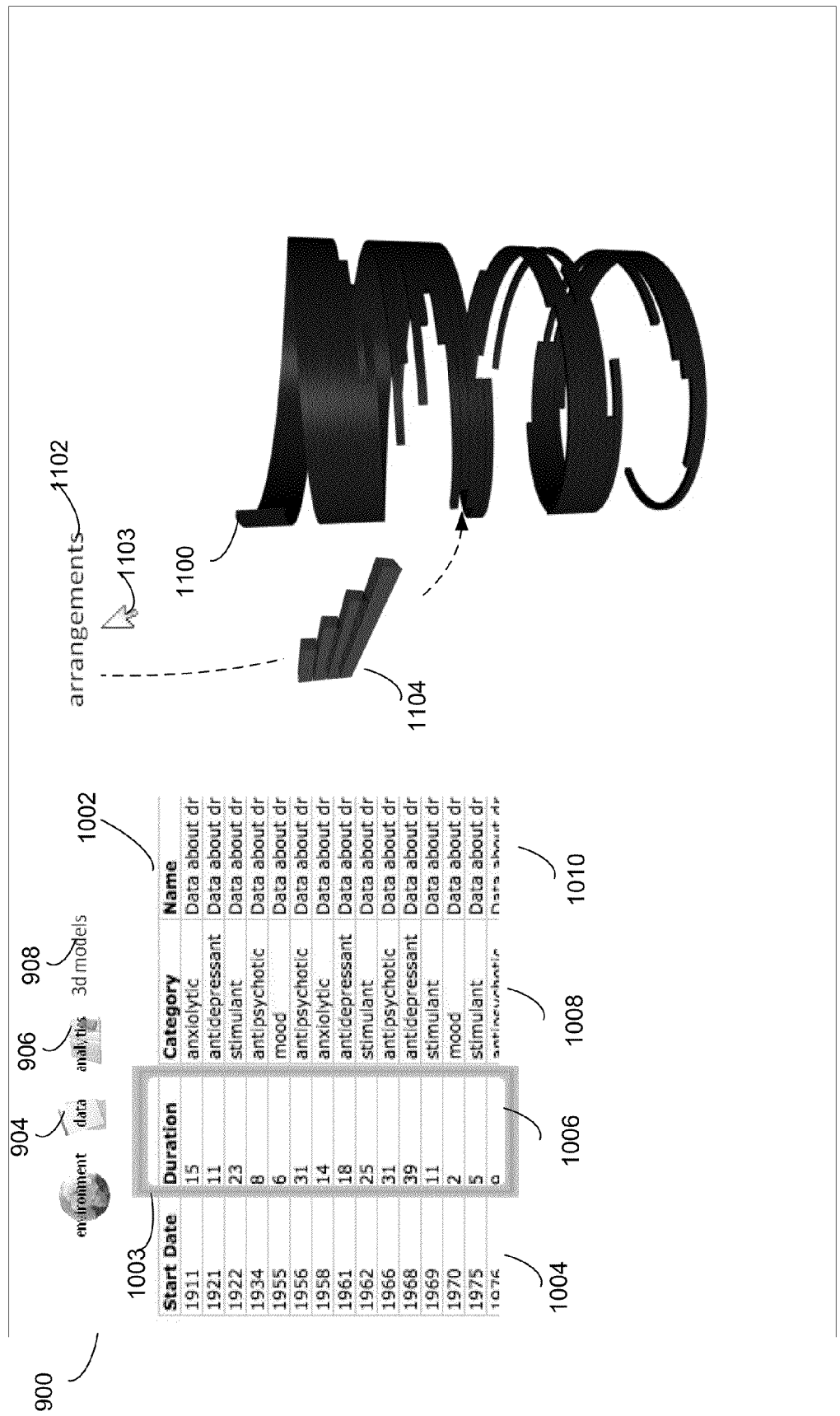

FIG. 11 illustrates schematically a graphical object 1100 modified as a result of the representation of another portion of the data set 1002, the column "Duration" 1006. The selection of this portion of the data set is shown in FIG. 11 by the frame 1003 around this column. A detailed description of this step of the incremental modification of the graphical object is not shown for the sake of brevity. Regardless of the way in which the graphical object is modified at this step, the graphical object now represents two portions of the data set 1002. FIG. 11 shows that visual display components 1012 and 1013 are replicated and visually modified to represent these portions of the data set 1002. The appearance of the graphical object is therefore modified as well.

FIG. 11 also illustrates that visual display components may be selectable by the user. For example, arrangements 1102 may be selected, as shown by a pointer 1003, and "dragged" onto or otherwise associated with the graphical object 1100. In this example, the arrangement includes a gravity stacker 1104 which indicated a manner in which segments are positioned ("stacked" in three dimensions) along the helix.

Figure 12:
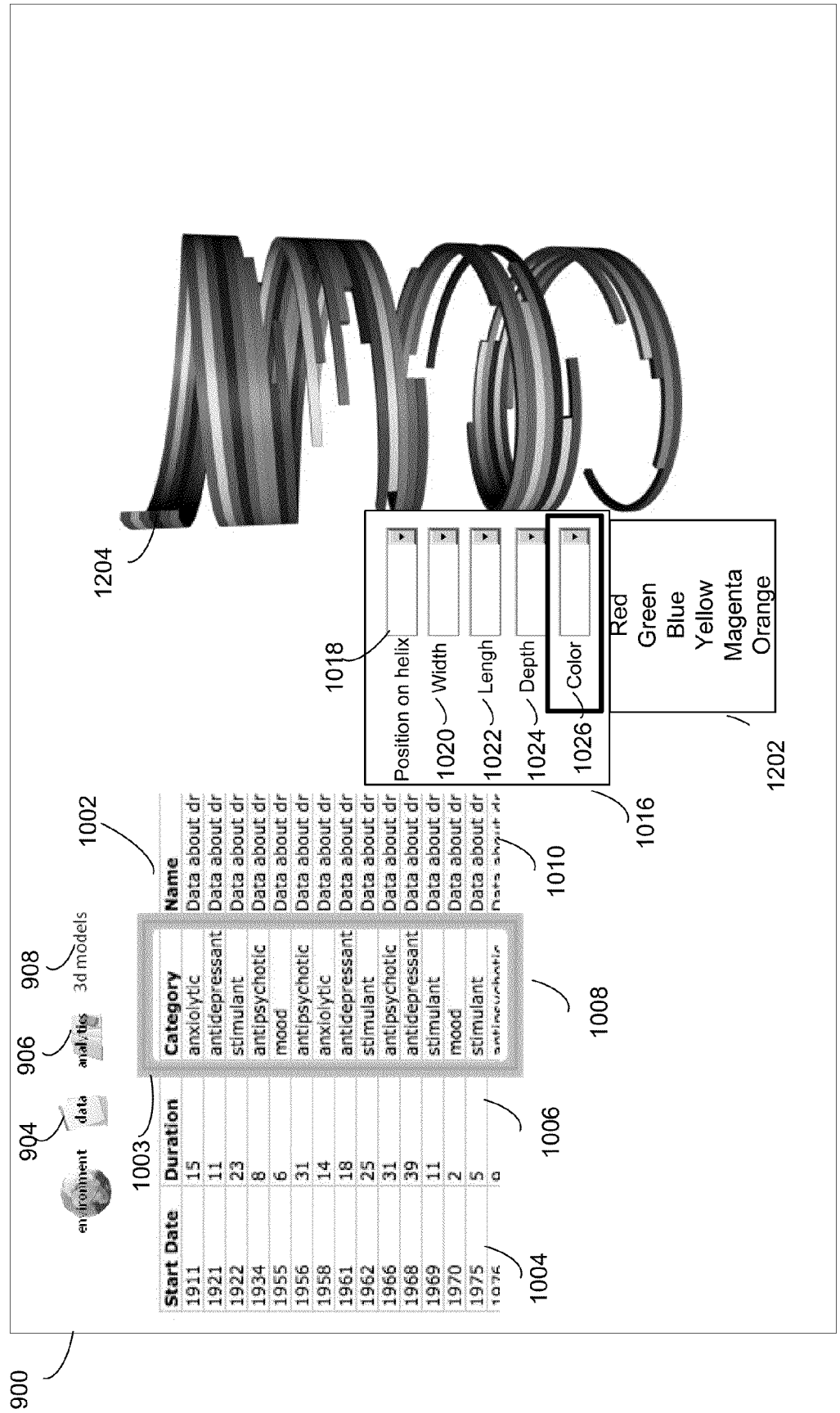

The visual representation of another portion of the data set 1002, the column "Category" 1008, is shown in FIG. 12. The control 1016 is shown again and here it is used to receive user input specifying colors for drug categories. A different color may be used to represent a different drug category. The menu "Color" 1026 may be a drop-down menu from which the user may select from a collection of colors 1202 to represent drug categories. A modified graphical object 1204 is shown in FIG. 12 that represents columns "Start Date" 1004, "Duration" 1006 and "Category" 1008 from the data set 1002 using as a basis a three-dimensional helix.

Figure 13:
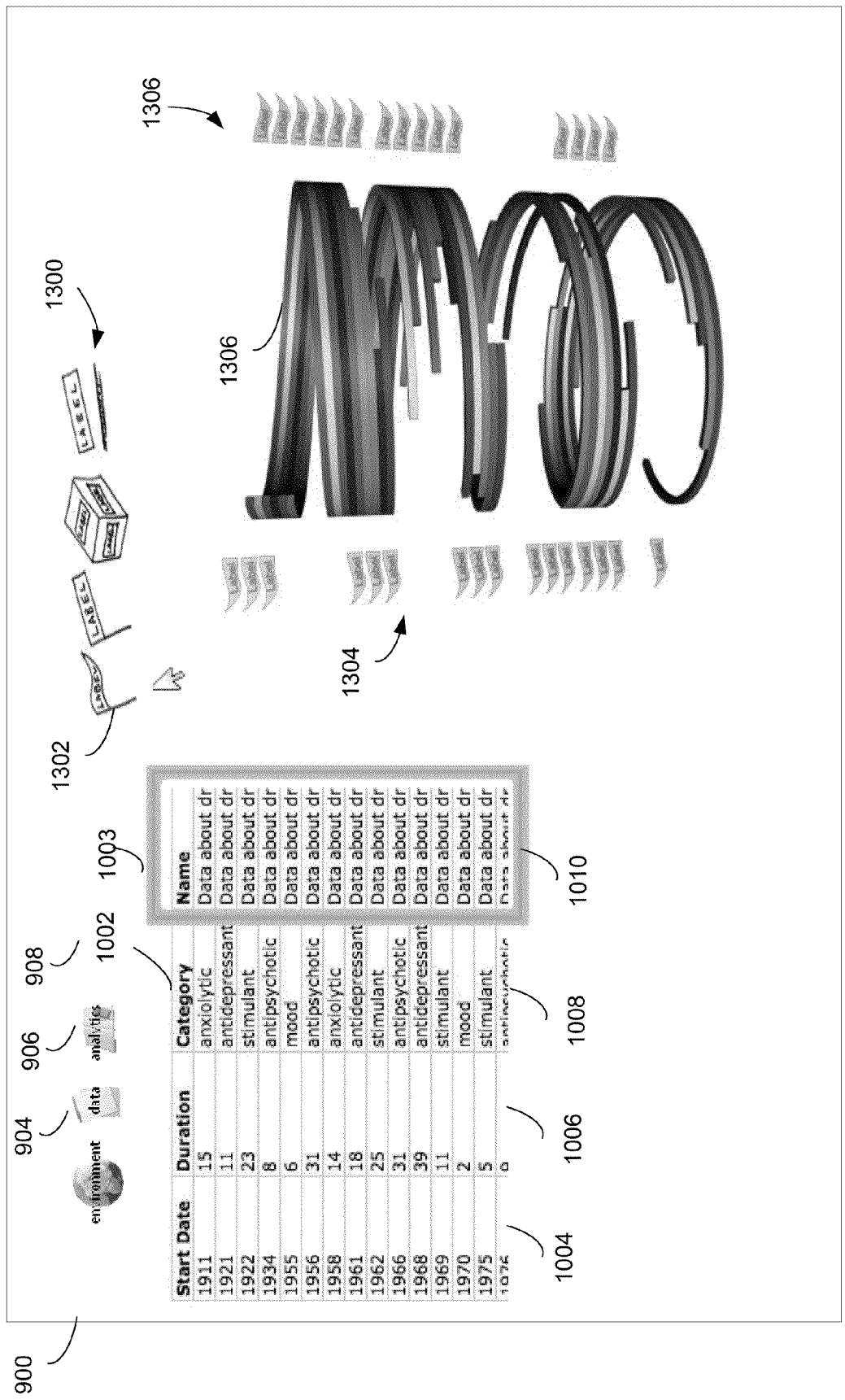

Another portion of the data set 1002, the column "Name" 1010, may be represented using the graphical object comprising the three-dimensional helix. This is shown in FIG. 13. When this portion of the data set is indicated (e.g., selected based on user input and "dragged" onto the graphical object), visual display components comprising labels for different drugs in the data set may be identified. These visual display components may be proposed on canvas 900 for the user's selection as visual display components 1300 comprising different types of labels which may be used to label the portions of the data set represented using the graphical object. The user may select one or more of the labels 1300. For example, a label 1302 may be selected and associated (e.g., "dragged" onto or otherwise associated) with the graphical object. The thus modified graphical object 1306 may be augmented with sets of labels 1304 and 1306 of the type 1302, as shown in FIG. 13.

In some embodiments, a suggestion for incorporating a particular visual display component configured for interaction with a data set in the user interface includes presenting an animation on the user interface that displays the proposed visual display component for the user to be able to select.

Embodiments described herein provide a way to visually display a data set. Any suitable data may be visually represented using the techniques described herein. A graphical object may be used as a basis for the visual representation of the data set. The appearance of the graphical object may be incrementally modified by representing portions of the data set through visual display components using the graphical object. Visual display components may be identified to represent a portion of the data set and proposed for the user's selection. When a suitable input indicating a selection of a visual display component is received, the selected visual display component may be linked to the portion of the data set so that to modify the graphical object. Different visual display components may be selected and proposed for the user's selection for representing different portions of the data set. The desired representation of the data set using the graphical object may thus be ultimately created. Accordingly, user experience may be improved because the user is guided through the interactive process of creating a visual representation of the data set. Moreover, the user may be able to provide suitable input to effect modifications to the representation of the data set.

It should be appreciated that techniques described herein are not limited to any particular graphical objects used for data representation and may utilize different types of visual objects. The techniques are also not limited to any particular visual display components that can represent at least a portion of a data set. Accordingly, any suitable visual display components may be identified and proposed to the user's selection. The visual display components may have any visual characteristics suitable for representation of data. In some scenarios, the visual display components may be interactive and may therefore receive user input with respect to parameters that influence representation of different aspects of the data and provide output reflecting changes effected via the user input.

It should also be appreciated that the techniques described herein are not limited to any particular way in which visual display components may be identified. For example, the visual display components capable of representing a portion of the data set that already exist in the graphical object may be identified. Also, other visual display components that can be used to augment the graphical object when linked to the portion of the data set may be identified.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other non-transitory, tangible computer storage medium) encoded with one or more programs that, when executed on one or more computers or other processors, perform methods that implement the various embodiments of the invention discussed above. The computer readable storage medium or media can be transportable, such that the program or programs stored thereon can be loaded onto one or more different computers or other processors to implement various aspects of the present invention as discussed above. As used herein, the term "non-transitory computer-readable storage medium" encompasses only a computer-readable medium that can be considered to be a manufacture (i.e., article of manufacture) or a machine. Alternatively or additionally, the invention may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method of using at least one processor to visually display a data set using a graphical object, the method comprising:
   with the at least one processor:
      identifying at least one visual display component to represent at least one portion of the data set, based on:
         at least one visual characteristic of each identified visual display component of the at least one visual display component and
         at least one parameter of the at least one portion of the data set;
      proposing to a user the at least one visual display component;
      in response to receiving an indication of a selection of a selected visual display component, modifying an appearance of the graphical object to yield a modified graphical object having a visual element that more suitably accommodates the selected visual display component; and
      augmenting the modified graphical object by representing, using the visual element, the at least one portion of the data set through the selected visual display component.

2. The method of claim 1, wherein modifying the graphical object comprises augmenting the graphical object with the selected visual display component.

3. The method of claim 1, further comprising:
   identifying at least one second visual display component to represent at least one second portion of the data set based on at least one characteristic of the modified graphical object and at least one second parameter of the at least one second portion of the data set;
   proposing to the user the at least one second visual display component; and
   in response to receiving user input indicating selection of the at least one second visual display component, modifying the modified graphical object by representing the at least one second portion of the data set through the at least one second visual display component.

4. The method of claim 1, further comprising:
   receiving the graphical object, the receiving comprising receiving a sketch of at least one graphical object.

5. The method of claim 1, wherein the at least one visual characteristic of each identified visual display component includes at least one of color, shape, texture, a plurality of segments of the visual display component, a plurality of visual elements, at least one segment of a visual element from the plurality of visual elements, at least one stack of visual elements, at least one cluster of visual elements, at least one grouping of visual elements, or a plurality of boundaries that map to the at least one portion of the data set.

6. The method of claim 1, wherein:
   the at least one portion of the data set comprises a dimension of the data set; and
   identifying the at least one visual display component comprises matching a characteristic the dimension of the data set with at least one visual characteristic of the visual display component that is configured to be controlled by a parameter that, varies in a same way as values in the dimension of the data set.

7. The method of claim 1, further comprising identifying an insight that the user desires to gain from displaying of the at least one portion of the data set.

8. The method of claim 7, wherein identifying the at least one visual display component comprises identifying the at least one visual display component from a library of visual display components based on the desired insight, wherein each visual display component in the library is stored in association with at least one insight that can be revealed from representing data using the visual display component.

9. The method of claim 7, wherein the insight is identified by at least one of receiving user input indicating the insight, identifying the insight from the at least one visual characteristic of the graphical object or identifying the insight from at least one prior interaction with the data set.

10. At least one computer-readable storage medium comprising computer-executable instructions that, when executed by at least one processor, perform a method of visually displaying a graphical object, the method comprising:

receiving user input indicating a portion of the data set;
identifying at least one visual display component to represent the at least one portion of the data set, based on:
   at least one visual characteristic of each identified visual display component of the at least one visual display component and
   at least one parameter of the at least one portion of the data set;
proposing to a user the at least one visual display component; and
in response to receiving user input indicating a selection of a selected visual display component of the at least one visual display component, modifying an appearance of the graphical object to yield a modified graphical object having a visual element that more suitably accommodates the selected visual display component; and
augmenting the modified graphical object by representing the at least one portion of the data set through the selected visual display component such that the selected visual display component conforms to a contour of the visual element of the modified graphical object.

11. The at least one computer-readable storage medium of claim 10, wherein identifying the at least one visual display component comprises identifying the at least one visual display component in the graphical object.

12. The at least one computer-readable storage medium of claim 11, wherein, when the at least one visual display component is not identified in the graphical object, the method further comprises augmenting the graphical object with the selected visual display component.

13. The at least one computer-readable storage medium of claim 10, wherein modifying the at least one visual display component comprises at least one of replicating the at least one visual display component, dividing the at least one visual display component into at least two sections, stacking visual elements of the visual display component, or clustering visual elements of the visual display component.

14. The at least one computer-readable storage medium of claim 10, wherein the user input includes a selection of selecting the graphical object based on a type of data in the data set.

15. The at least one computer-readable storage medium of claim 10, wherein the at least one parameter of the at least one portion of the data set comprises a type of data in the at least one portion of the data.

16. A method of operating a computing device to create a visualization of a data set using a graphical object, the method comprising:
   receiving a selection of an initial graphical object from a gallery of proposed graphical objects;
   receiving a selection of an option to represent a data set;
   building a visual representation of the data set using the initial graphical object
   identifying at least one visual display component to represent at least one portion of the data set, the identifying based on
     (i) at least one visual characteristic of each identified visual display component,
     (ii) at least one parameter of the data set, and
     (iii) features of the initial graphical object;
   proposing to a user the at least one visual display component;
   receiving an indication of a selection of a selected visual display component to display the data set; and
   modifying an appearance of the graphical object to yield a modified graphical object that more suitably accommodates the visual display component; and
   augmenting the modified graphical object by representing the at least one portion of the data set through the selected visual display component.

17. The method of claim 16, wherein identifying the at least one visual display component to represent the at least one portion of the data set comprises identifying the at least one visual display component based on at least one visual characteristic of the graphical object and at least one parameter of the at least one portion of the data set.

18. The method of claim 16, further comprising:
   identifying at least one second visual display component to represent at least one second portion of the data set based on at least one characteristic of the modified graphical object and at least one second parameter of the at least one second portion of the data set;
   proposing to the user the at least one second visual display component; and
   in response to receiving user input indicating selection of the at least one second visual display component, modifying the modified graphical object by representing the at least one second portion of the data set through the at least one second visual display component.

19. The method of claim 16, further comprising displaying the identifying at least one visual display component on a virtual canvas in association with the graphical object.

20. The method of claim 16, wherein the identified at least one visual display component is more than one and the identified visual display components are stacked.

* * * * *